(12) United States Patent
Hutzler

(10) Patent No.: US 6,782,803 B2
(45) Date of Patent: *Aug. 31, 2004

(54) METHOD OF AND DEVICE FOR BASTING

(75) Inventor: Lawrence R. Hutzler, Lakeville, CT (US)

(73) Assignee: Hutzler Manufacturing Co., Inc., Canaan, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/155,165

(22) Filed: May 24, 2002

(65) Prior Publication Data

US 2002/0187228 A1 Dec. 12, 2002

Related U.S. Application Data

(63) Continuation-in-part of application No. 09/759,824, filed on Jan. 11, 2001, now Pat. No. 6,457,400.

(51) Int. Cl.[7] .............................................. A47J 37/10
(52) U.S. Cl. .......................... 99/345; 99/494; 99/532; 141/26; 141/357; 426/281; 426/302; 426/304
(58) Field of Search ..................... 99/345, 494, 532, 99/533; 141/26, 357, 25, 21, 352; 222/209, 213, 215; 426/281, 304, 303, 302

(56) References Cited

U.S. PATENT DOCUMENTS

| 3,754,469 | A |   | 8/1973  | Gasior  | 99/532 |
|-----------|---|---|---------|---------|--------|
| 4,254,700 | A |   | 3/1981  | Fleming | 99/532 |
| 5,408,919 | A |   | 4/1995  | Hutzler | 99/345 |
| 5,638,872 | A |   | 6/1997  | Porter  | 141/26 |
| 6,457,400 | B1| * | 10/2002 | Hutzler | 99/345 |

* cited by examiner

*Primary Examiner*—Reginald L. Alexander
(74) *Attorney, Agent, or Firm*—Michael J. Striker

(57) ABSTRACT

For basting a substance is sucked into the cylinder and expelled from the cylinder, a removable injecting element is connected with the cylinder and has a front part having an outlet opening, at least the front part of the injecting element connected with the cylinder is inserted into an object and the substance is injected from the cylinder through the injecting element and through an opening in the front part of the injecting element into an interior of the object, and alternatingly the injecting element can be disconnected and removed from the cylinder, and the substance can be expelled from the cylinder through an outlet opening which is wider than the opening in the front part of the injecting element, directly onto an exterior of the object.

5 Claims, 2 Drawing Sheets

US 6,782,803 B2

METHOD OF AND DEVICE FOR BASTING

CONTINUATION-IN-PART APPLICATION

This application is a continuation-in-part of application Ser. No. 09/759,824, filed Jan. 11, 2001, now U.S. Pat. No. 6,457,400.

BACKGROUND OF THE INVENTION

The present invention relates to a method of and a device for basting.

Basters to be used in cooking are well known. A known baster sucks a substance into a receptacle and then expels it from the receptacle and injects it into an object to be cooked. The above described baster is disclosed in my U.S. Pat. No. 5,408,919. Some devices are disclosed in U.S. Pat. Nos. 3,754,469; 4,254,700 and 5,638,872. It is believed that this baster can be further improved.

SUMMARY OF THE INVENTION

Accordingly, it is an object of the present invention to provide a method of and a device for basting which are further improvements of the existing solutions.

In keeping with these objects and with others which will become apparent hereinafter, one feature of the present invention resides, briefly stated, in a method of basting which has the steps of sucking a substance into a cylinder and expelling the substance from the cylinder; connecting a removable injecting element with the cylinder with a front part having an outlet opening; inserting at least the front part of the injecting element connected with the cylinder into an object and injecting the substance from the cylinder through the injecting element and through an opening in the front part of the injecting element into an interior of the object; alternatingly disconnecting and removing the injecting element from the cylinder and expelling the substance from the cylinder through an outlet opening which is wider than the opening in the front part of the injecting element, directly onto an exterior of the object.

It is another feature of the present invention to provide a baster which has a cylinder; means for sucking a substance into said cylinder and expelling the substance from said cylinder; a removable injecting element connectable with said cylinder and having a front part insertable into an object and provided with an outlet opening; means for connecting said injecting element with said cylinder, so that when said injecting element is attached to said cylinder, said injecting element is insertable into an object and the substance is injectable into an interior of the object through said opening of said front of said injecting element, said cylinder having an outlet opening which is wider than said opening of said front part of said injecting element, so that when said injecting element is removed from the cylinder, the substance can be expelled through said wider opening of said cylinder onto an exterior of the object.

When the method is performed and device is designed in accordance with the present invention, it is possible to introduce the injecting element into an object at any place, into any depth, accurately into a spot into which the substance has to be delivered in the interior of the object. On the other hand, when the injecting element is removed, the substance is delivered onto the surface of the objects.

In accordance with another important feature of the present invention, the injecting element is located mainly inside the cylinder, while only its front part provided for direct injection is located outside the cylinder. This protects the injecting element from contamination.

In accordance with still a further feature of the present invention, the outer surface of the cylinder is smooth and does not have any threads or other components, as in the prior art mentioned in this application. When the parts of the baster are connected by outwardly accessible threads, the threads can be contaminated and the substance can penetrate through it into the interior of the cylinder. This is avoided in the present invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
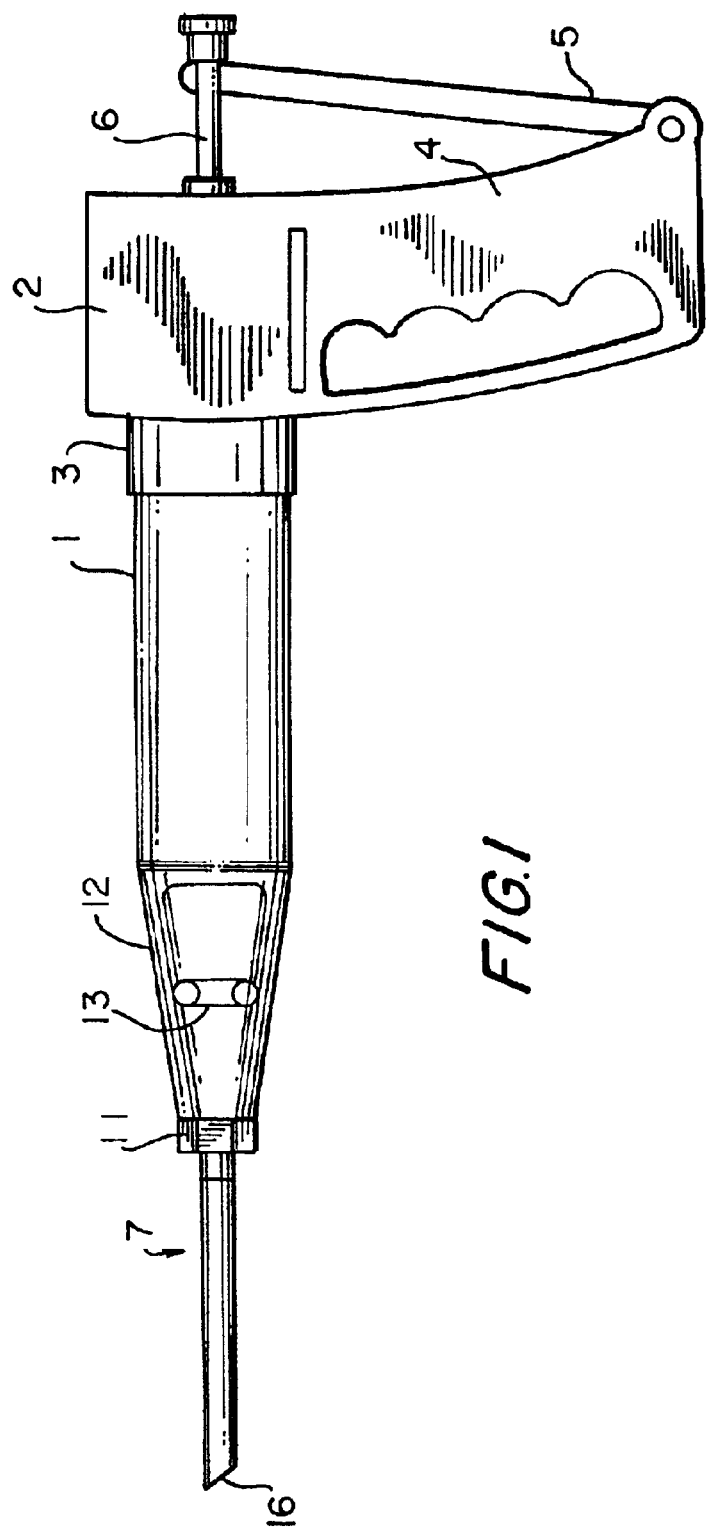
FIG. 1 is a view schematically showing a baster in accordance with the present invention.
Figure 2:
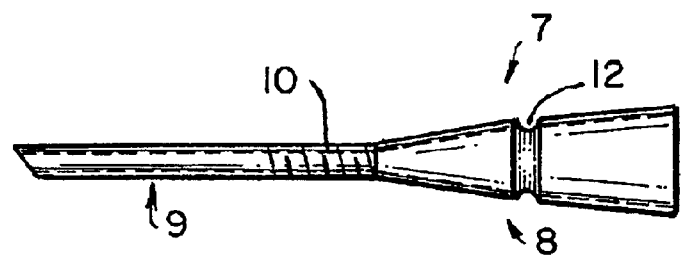
FIG. 2 is a view showing an injecting element of the inventive baster.
Figure 3:
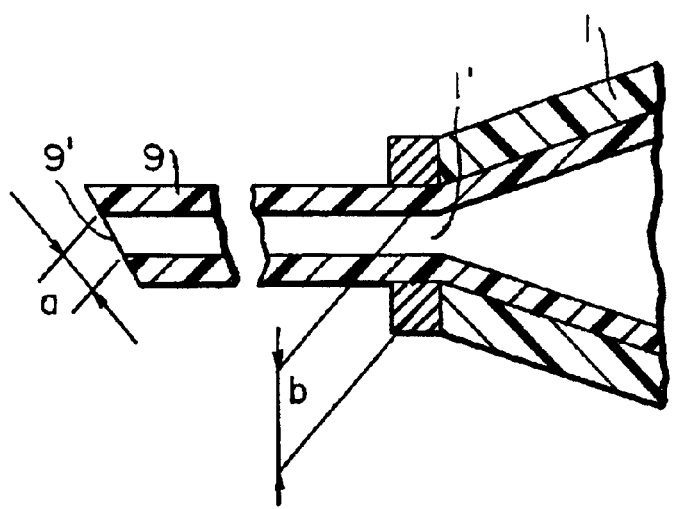
FIG. 3 is an enlarged view of a portion of the cylinder and the injecting element of the inventive baster.

A baster in accordance with the present invention has a cylinder which is identified as a whole with reference numeral 1. The cylinder 1 is removably attachable to a body which is identified with reference numeral 2 and accommodates a pumping means for sucking a substance into the cylinder 1 and then expelling the substance from the cylinder 1 into an object. The pumping means can be of a conventional design, such as disclosed in my U.S. Pat. No. 5,408,919 which is incorporated here as a reference. The body 2 has a front projection 3 in which a rear portion of the cylinder 1 is insertable, for example by tight fitting. The body 2 also has a station on handle 4 which is to be held by a user of the baster, and a movable handle 5 which is connected with a piston rod 6 of a piston. By moving the handle 5 relative to the stationary handle 4, the piston reciprocates in an inner chamber of the body 2 to suck the substance into the cylinder 1 and thereafter to expel it from the cylinder.

In accordance with the present invention, the baster is provided with an injecting element which is identified as a whole with reference numeral 7. The injecting element 7 has a rear part 8 and a front part 9. The rear part 8 is accommodated fully in the interior of the cylinder, and only the front part 8 extends forwardly beyond the cylinder. The rear part 8 and the front part 9 can be connected with one another, for example of one piece and made of plastic, for example by injection molding. As can be seen from the drawings, the rear part 8 is substantially conical, and its outer contour substantially corresponds to the inner contour of a conical front part of the cylinder 1. The front part 9 of the injecting element 7 is substantially cylindrical. The injecting element 7 is hollow and has a narrow central narrow passage which communicates with an interior of the cylinder "a". The central passage has a narrow outlet opening 9' having a diameter "b". The cylinder 1 also has an outlet opening 1' with a diameter "b" which is greater than the diameter "a". Also, the outer diameter of the front part of the injecting element is smaller than the outer diameter of the cylinder 1.

Means are provided for connecting the injecting element 7 to the cylinder 1. The connecting means include for example a thread 10 provided on an outer surface of the injecting element 7, and a nut 11 which is screwable on the thread 10, as will be explained herein below. The injecting element 7 is further provided with sealing means for sealing the injecting element 7 relative to the cylinder 1. The sealing means include a groove 12 provided on the conical rear part 8 of the injecting element sealing element 13 inserted in the groove 12 so that it extends radially outwardly beyond the outer surface of the rear part 8 of the injecting element 7.

The front end 15 of the injecting element 7 can be also sharp. In particular, it can be cut off at an angle relative to the axis of the injecting element so as to provide a sharp tip for piercing the object to be injected.

In order to assemble the injecting element 7 with the cylinder 1 of the baster, the cylinder 1 is removed from the front projection 3 of the body 2 of the baster, the injecting element 7 is introduced into the cylinder 1 from the right end of the cylinder as considered in the drawing and pushed to the left, until the conical rear part 8 of the injecting element 7 is introduced into the conical front part of the cylinder 1 and the seal 13 abuts against the inner surface of the front part of the cylinder 1. Then, the nut 11 is screwed on the thread 10 until it abuts against the front end of the front portion of the cylinder 1. The injecting element 7 is therefore tightly connected with the cylinder 1. Then for operation of the baster, by acting on the handle 5 and therefore on the piston rod 6, the piston is pulled to the right and the substance is introduced into the cylinder 1 through the injecting element 7. Thereafter, by moving the handle 5 toward the handle 4 the piston is moved forwardly, and the substance is expelled from the cylinder 1 through the injecting element 7 into the object.

The inventive baster can operate in accordance with two different modes. When it suffices to place a substance on an exterior surface of an object, the injecting element 7 can be removed and the substance is expelled directly out of the cylinder 1, in particular through its larger outlet opening 1', onto the object. When, however it is necessary to introduce the substance into an interior of the object, the injecting element 7 is introduced into the cylinder 1, the smaller diameter injecting element with its narrow, sharp tip 16 is inserted into the object, and the substance is injected through the narrow inner passage and the narrow outlet opening 9' of the injecting element into the interior of the object.

It will be understood that each of the elements described above, or two or more together, may also find a useful application in other types of constructions differing from the types described above.

While the invention has been illustrated and described as embodied in baster, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A baster, comprising a cylinder, means for sucking a substance into said cylinder and expelling the substance from said cylinder; a removable injecting element connectable with said cylinder and having a front part releasably insertable into an object and provided with an outlet opening; means for connecting said injecting element with said cylinder, so that when said injecting element is attached to said cylinder, said injecting element is insertable into an object and the substance is injectable into an interior of the object through said opening of said front of said injecting element, said cylinder having an outlet opening which is wider than said opening of said front part of said injecting element, so that when said injecting element is removed from the cylinder, the substance is expellable through said wider opening of said cylinder onto an exterior of the object, said injecting element being accommodated inside the cylinder so that only the front part of the injecting element is located outside the cylinder.

2. A baster as defined in claim 1; and wherein said cylinder has an outer smooth surface without threaded connecting means for connecting the injecting element with the cylinder.

3. A method of basting, comprising the steps of sucking a substance into a cylinder and then expelling the substance from the cylinder, connecting a removable injecting element having a front part with an outlet opening, into the cylinder, inserting at least the front part of the injecting element connected with the cylinder into an object and injecting the substance from the cylinder through the injecting element in the front part of the injecting element into an interior of the object; alternatingly disconnecting and removing the injecting element from the cylinder and expelling the substance from the cylinder only through an outlet opening of the cylinder, which is wider than the opening in the front part of the injecting element, directly onto an exterior of the object.

4. A method as defined in claim 3; and further comprising providing the cylinder with an outer smooth surface without threaded connecting means for connecting the injecting element with the cylinder.

5. A method of basting, comprising the steps of sucking a substance into a cylinder and then expelling the substance from the cylinder connecting a removable injecting element having a front part with an outlet opening, into the cylinder, inserting at least the front part of the injecting element connected with the cylinder into an object and injecting the substance from the cylinder through the injecting element and through the outlet opening in the front part of the injecting element into an interior of the object; alternatingly disconnecting and removing the injecting element from the cylinder and expelling the substance from the cylinder through an outlet opening of the cylinder, which is wider than the opening in the front part of the injecting element, directly onto an exterior of the object; and accommodating the injecting element inside the cylinder so that only the front part of the injecting element is located outside the cylinder.

\* \* \* \* \*